May 12, 1931.    J. C. HOOVER    1,805,094
SET CHECKER
Filed Oct. 25, 1926    2 Sheets-Sheet 2
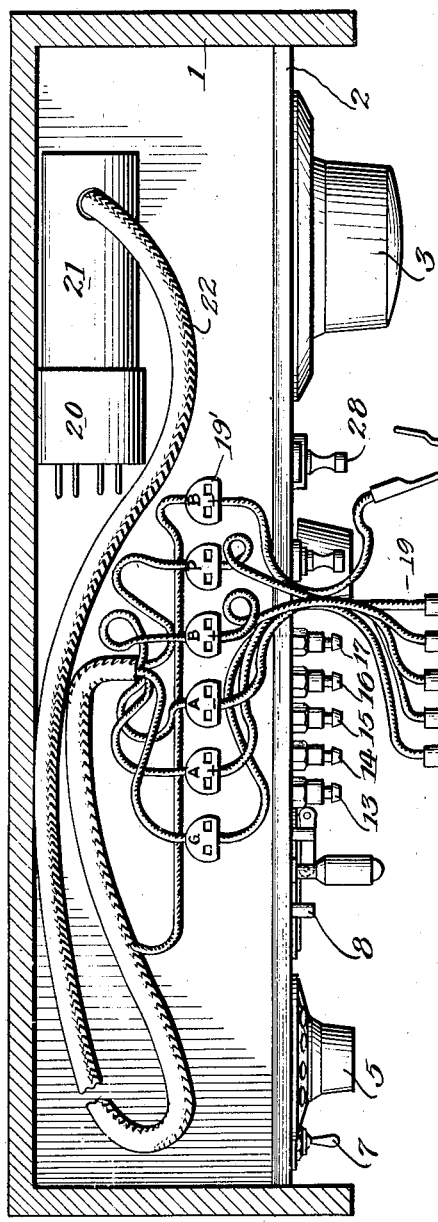
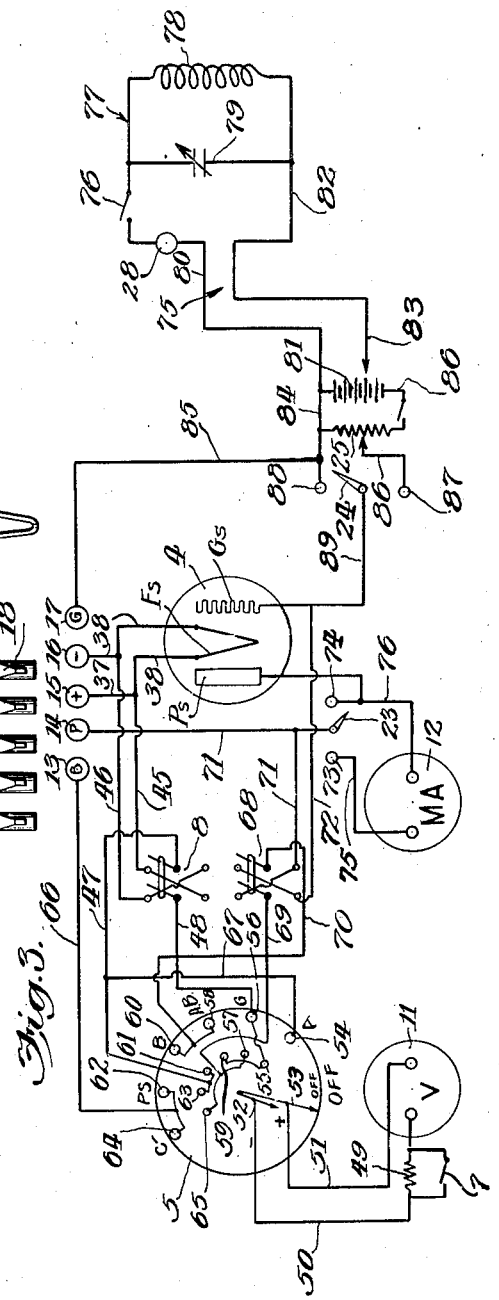
Inventor:
J. C. Hoover
By Williams, Bradbury,
McCabe & Hinkle, Attys.

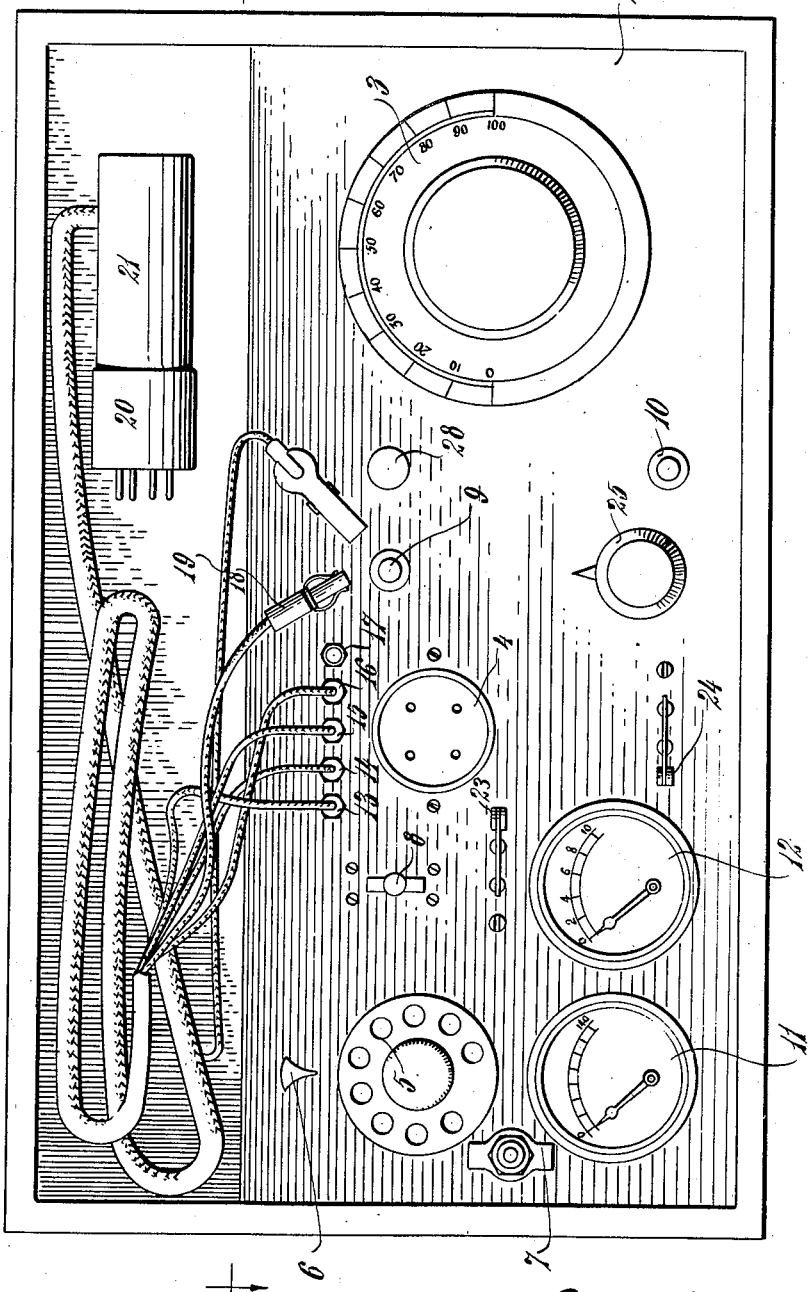

Patented May 12, 1931

1,805,094

UNITED STATES PATENT OFFICE

JOSEPH C. HOOVER, OF DETROIT, MICHIGAN, ASSIGNOR, BY MESNE ASSIGNMENTS, TO JEWELL ELECTRICAL INSTRUMENT COMPANY, OF CHICAGO, ILLINOIS, A CORPORATION OF ILLINOIS

SET CHECKER

Application filed October 25, 1926. Serial No. 143,976.

This invention relates to improvements in devices for determining various features particularly operative efficiencies of the respective elements in a radio reception device.

In general, various devices have been provided for testing radio tubes independently of the remainder of the radio set and only upon purchase of the same particularly in radio stores. The object of the present invention is to provide for an apparatus adapted for determining the various conditions within the radio reception device; the checking or calibrating being carried on under normal operating conditions within the radio reception device, and the calibration being determined for the various elements in the radio reception device in conjunction with power supply means all independently thereof and in the respective relation of the said elements as associated with the remaining elements.

Broadly then, it is the purpose of this invention to provide for a novel form of checking or calibrating mechanism for determining the dynamic characteristics of the various amplifying tube elements independently of one another and in their respective relation to the remaining tubes in the adjoining or cooperating stages and in the other associated stages of different type, and for determining the characteristics of the various independent circuits and elements comprising the same; and to provide a unitary means—that is, a single cable element having one end provided with prongs leading to the respective elements which function in the operation of a radio receiver; that is, the actual elements capable of bringing about the progressive amplification and transposition of the entering wireless signals, and having the other end provided with a series of clips or binding post members for being interconnected with the respective calibrating or registering elements within the set checker.

This invention has consequently as its main feature the provision for a unitary means having several interconnecting media therein for providing for a positive test; that is, a dynamic test at various stages in the radio reception circuit under normal operating conditions with the various batteries; for example, the A, B, and C batteries.

Further, it is an aim of this invention to provide for an instrument having thereon a series of calibrated meters or elements interconnected by means of binding posts and adapted upon a mere actuation of control element to introduce and bring about accurate visible illustration of the various conditions within the radio circuit at any designated position.

One of the objects of the present invention is the provision of a testing device or method for determining the various conditions existing in an audion tube circuit such as a radio receiving set under operating conditions.

Another object is the provision of a tester of the class described capable of determining the voltage conditions existing in an audion tube circuit on open circuit or with the tubes removed.

Another object is the provision of a tester of the class described which is peculiarly adapted to be conveniently used on existing audion tube circuits, such as those used in radio receiving devices, for determining the dynamic voltage and current characteristics of the circuit or audion tubes, or for locating trouble in the device.

Another object is the provision of an improved testing device of the class described, capable of performing various desirable testing operations on the tubes, circuits, condensers, and other units of an amplifying circuit to determine the condition of each part and thereby locate defective parts, or conditions.

Another object is the provision of an improved method of testing thermionic amplifiers, and amplifier circuits, to determine the worth of the thermionic amplifier, locate defects in the amplifier, or locate defects in the circuit.

Another object is the provision of an improved testing device capable of testing both audion tubes and the audion tube circuits.

Among the objects of the invention, it is aimed to provide a set testing or checking apparatus wherein the various characteristics both normal, inactive, and dynamic are readily determinable upon the introduction of a multi-wired cable into any one or any series of the various elements associated in a radio reception device; to provide a testing device element each of the several calibrating steps in determining the functions or characteristics of a radio reception device or its component parts may be readily determinable upon the interpolation or introduction of a conductor directly connected by a series of particularly designated leads positioned in a unitary cable, so that the operator can in a movement of the control mechanism within the testing device, determine the various normal and dynamic phenomena with respect to the several operating elements and their functions when interpreted in resistance, voltage, or other characteristics, capable of indication upon the standard electrical indicating elements adapted for testing.

Particularly it is the aim of this invention to provide for a novel form of unitary mechanism including a plurality of recording instruments in association with conductors and control elements whereby a normal and dynamic characteristic indication may be obtained of a radio receiving device and its component elements.

Further, it is aimed to provide a novel form of interconnecting cable element including a series of associated individual conductors all leading to a contact element which contact element is insertable within one of the several sockets whereby the electrical conditions in the various stages of amplification within the radio receiving apparatus, particularly the electrical relationship of the various batteries and the voltages on the grids and resistance elements and the filament current may be readily ascertained at any and all stages of amplification.

Still further, it is aimed to provide a mechanism comprising calibrating means adapted to function with respect to determining the various electrical conditions or characteristics of the elements in a radio receiving device considered individually when inoperative and when under normal operating conditions.

These and other advantages, capabilities, and features of the invention will appear from the subjoint detail description of one specific embodiment illustrated in the accompanying drawings, in which:

Fig. 1 is a plan view of the device.

Fig. 2 is the side elevation of the device partly in section along lines 2—2 of Fig. 1, and Fig. 3 is the wiring diagram of the device.

Referring to the reference characters in the drawing, numeral 1 represents a casing member having thereon a panel member 2 upon which panel member there is adapted to be positioned a series of control members of which 3 is the control member cooperating to bring about the same conditions in the socket 4 that prevail in the radio receiver which is being tested.

The tube socket 4 may consist of any conventional audion tube socket provided with the usual contacts and is diagrammatically indicated by the circle 4 with the usual symbols $P_s$ for the plate, $F_s$ for the filament, and $G_s$ for the grid of an audion tube in the socket. It will be understood that the audion tube to be tested or inserted in the circuit is inserted into the socket 4 and the wiring diagram merely shows the elements of the audion tube diagrammatically.

Numeral 5 represents the control switch, which is interconnected with the remaining elements of the device by means of conductors so that the rotation thereof, will bring the respective indicia thereon, which indicia will be described in more detail later, in line with the pointer 6. The control switch 5 is operable to carry out its functions in this set checker in conjunction with the series of switch members 7, 8, 9, and 10 which are adapted to bring about proper connection between the respective calibrating instruments as for instance the voltmeter 11 and the milliammeter 12.

The control switch 5 consists of a rotary selector switch for connecting the voltmeter 11 in a plurality of different ways to the other circuits of the testing device. The various positions of the control switch 5 are indicated as off, A, indicating the measurement of the A or filament voltage, G, indicating the measurement of the grid voltage, AB indicating the measurement of the voltage from the grid to the plate, B indicating the voltage from the plate to the filament, PS, the voltage between the filament of the socket and the B battery terminal, C— the voltage between the B battery terminal and the grid or plate.

The voltmeter 11 may consist of an instrument which is provided with a multiplying resistance 49 adapted to be shunted by the switch 7, thereby giving the voltmeter a plurality of ranges, both of which are controlled by the selector switch 5. Leads 50 and 51 extend from the voltmeter 11 to the selector switch arms 52, 53, which are adapted to contact with the various contacts of the selector switch 5.

The contacts of the selector switch 5 for the A, or filament voltage test, are designated by the numerals 54 and 55. The contacts for the G or grid voltage test, are designated by the numerals 56 and 57. The contacts for the AB test are designated by the numerals 58, 59. The contacts for the B voltage test are designated by the numerals 60 and 61. The contacts for the primary secondary or PS test are designated by the numerals 62, 63. The contacts for the C— test are designated by the numerals 64, 65.

Adjacent the tube socket 4, and in connective relation therewith, there are positioned a series of binding posts, of which, numeral 13 represents a binding post interconnected with a lead from the plus terminal of the B battery; numeral 14 is the binding post leading to and interconnected with the plate lead; numeral 15 represents the binding post leading to the plus terminal of the filament connection or lead; numeral 16 represents the binding post interconnected with the minus lead of the filament; and numeral 17 represents the binding post leading from the grid connection in the socket.

To the binding post there are attachable a series of flexible clips 18, which clips are adapted to press upon, and contact with the body of the posts, and each of which clips has attachable directly thereto wires or conductors 19, all of which conductors are labeled or colored, either indicated by means of metal tags 19', so as to be properly associated with the binding post and the prongs 20 which extend from either the vacuum tube or from the test plug 21, which test plug has its base formed similarly to that of a vacuum tube and which consequently fits into the socket member of the radio receiver.

A test cable 22 is applied to carry these respective wires or conductors 19 above mentioned so as to make for simplicity of the structure and eliminate possible error to inadvertent misplacing or interconnection of the several conductors used in the device.

The filament $F_s$ may be directly connected through the contacts of socket 4 and conductors 37, 38 to the plus and minus binding posts 15 and 16, respectively. A pair of leads 45 and 46 extend from the filament leads 37 and 38 to the fixed contacts of the reversing switch 8. The movable contact arms of the reversing switch 8 are connected by leads 47 and 48 to the contacts of the rotary selector switch 5, lead 47 being connected to contacts 61 and 63, and lead 48 being connected to contact 56.

The reversing switch 8 is thus adapted to reverse the connections of the filament $F_s$ with respect to the voltmeter 11 and the voltage may be read to either side of the filament in various of the other tests by merely reversing the switch 8.

The B binding post 13 is connected by a conductor 66 to the contacts 62 and 64 of the rotary selector switch 5. The conductor 47 is connected by a conductor 67 to the A contact 54 of the rotary switch 5. The reversing switch 68 has one of its movable switch arms connected by a conductor 69 to the contacts 65, 59, 57 and 55 of the rotary switch 5. The other switch arm of the reversing switch 68 is connected by conductor 70 to the contacts 58 and 60 of the rotary switch.

The fixed contacts of the reversing switch 68 are connected by conductors 71 and 72 to the plate binding post 14 and to the grid $G_s$ through the grid contact of socket 4. The reversing switch 68 is thus adapted to reverse the connections of the plate and grid of a tube in the socket 4 with respect to the voltmeter 11 at will.

The milliammeter 12 is provided with a short-circuiting switch 23 which may be moved to either of the contacts 73 or 74, which contacts are connected by conductors 75 and 76 to the terminals of the milliammeter 12. The switch 23 is thus adapted to short-circuit the milliammeter 12 when the switch arm 23 is in engagement with contact 74, or to interpose the milliammeter 12 in the plate circuit when the switch arm 23 is in engagement with the contact 73.

The switch members 23 and 24 are adapted to cooperate respectively with the voltmeter and milliammeter in carrying out the dynamic tests and the potentiometer 25 is adapted to function when the switch member 24 is crossed so as to bring about a means for determining the dynamic characteristics of the respective circuit to be tested under all operating conditions.

The testing device is preferably provided with a separate source of electrical oscillations indicated in its entirety by the numeral 75 for the purpose of impressing electrical oscillations of a predetermined frequency on the audion tube circuit or radio receiving set, through the test plug 20. This source of oscillations may be used to test the audion tube circuit under dynamic conditions when no signals are being received, and it may also be used for checking the tuning of the audion tube circuit and calibrating the tuning indicia with the indicia appearing upon the dial of the wavemeter 3.

The oscillator may also be used for correcting the tuning of the condenser plates. The oscillator 75 preferably includes a conventional buzzer 28 which is connected through a switch 76 to a resonant circuit or wave meter 77, consisting of an inductance 78 and a variable condenser 79 connected in parallel.

The variable condenser 79 may be adjusted by means of the control knob 3, so that the resonant circuit 77 is tuned to be resonant with oscillations of the frequency or wave length indicated on the dial or control knob 3.

A conductor 80 leads from the buzzer 28 to one terminal of the battery 81, and a conductor 82 leads from the wave meter 77 to an adjustable battery contact 83. One terminal of the battery 81 is connected through conductor 84 to one end of a resistance or potentiometer 25, and the other terminal of battery 81 is connected through conductor 86 and switch 87 to the other end of potentiometer 25. The conductor 84 and adjacent terminal of potentiometer 25 are connected through conductor 85 to the G binding post 17, and the movable contact arm 86 of potentiometer 25 is connected to a fixed contact 87 of a grid switch 24. Conductors 84 and 85 are connected to another fixed contact 88, and the grid switch 24 is connected through conductor 89 to the grid contact of the socket 4.

The switch 24 is thus adapted to connect the grid of the tube in the socket 4 directly to the grid conductor 84 which leads to the grid binding post and thence to the grid contact of the audion tube circuit under test through the test plug 20. The switch arm 24 may also be moved to the open circuit position, totally disconnecting the grid $G_s$ of the tube in the socket 4 from the energizing circuits, or the switch arm 24 may be moved into engagement with the contact 87 so that the grid is charged with a variable voltage depending upon the location of the movable contact arm 86 of the potentiometer 25.

The wave meter 77 comprising an inductance 78, a variable condenser 79, and a buzzer 28 has been provided in this device in order to check up the tendency or the capability of the radio receiver being tested with respect to being tuned to higher or lower wave lengths, and to determine whether the radio receiver to be tested is in its proper operating condition particularly with respect to the determination as to whether the radio receiver is properly calibrated on the frequencies which are encountered under the particular operating conditions desired.

The oscillator may be operated to impress electrical oscillations of any predetermined frequency within the range of operation of the oscillator, as follows. When the switch 76 is closed and the contact 83 is in engagement with one of the terminals of the battery cells 81, the buzzer 28 will buzz with a frequency which is dependent upon the strength of the buzzer spring, and the voltage impressed on the buzzer. The wave meter 77 may then be set at any predetermined wave length or frequency, and the shock oscillation of the make and break of the buzzer causes oscillations in the wave meter circuit of a predetermined frequency.

The indicia on the dial of the control knob 3 will indicate the frequency of the electrical oscillations impressed on the audion tube circuit.

The power input of the buzzer or strength of the oscillations may be regulated by moving the adjustable battery terminal 83 so that the signals are of the strength desired, and on placing the contact arm 24 in engagement with contact 87, the electrical oscillations of predetermined frequency will be superposed upon the direct current bias which is impressed on the grid $G_s$ by battery 81 through potentiometer 25. The audion tube circuit in question may then be calibrated as to the tuning indicia, or after the audion tube circuit has been tuned, the alignment of its condensers may be corrected so as to achieve exact resonance, at which point the hum produced by the speaker of the radio receiver will be loudest.

The oscillator may also be used for impressing electrical oscillations upon a tube in the socket 4, while the tube is under test for determining the worth of the tube or determining its emission or plate current under dynamic conditions.

The potentiometer 25 may also be used for impressing a variable potential on the grid, the grid voltage being indicated by the voltmeter 11, which is moved to the position G by means of the rotary selector switch 5, and the corresponding plate, filament or grid voltage may be read for plate current at any desired grid bias.

The provision of a separate battery for energizing the oscillator is very important, for the reason that it is practically impossible to secure uniform conditions by energizing the oscillator from a lighting current source or from the same source as the audion tube circuit, on account of the tendency to feed back into other circuits and change the actual conditions of operation.

As indicated in the drawings several of the elements particularly the switch members and the control member 5 have indicia thereon which indicia have been described in considering the operation of the device.

To test the set for open circuits, short circuits, or grounds. Turn switch 7 to off and switch 23 to off and switch 24 to off, the control member 5 to off, and switch 8 on plus; remove all the tubes from the set and connect all the batteries, the loud speaker, the ground and the aerial. Turn on the A battery switch on the set to be tested and connect the test cable 22 as per the markings on the respective posts 13 to 17 inclusive by means of the clips 18, then plug in the test cable 22 by means of the test plug 20 into the first socket in the set which is being tested and connect the fifth or extra lead wire to the plus B battery post which is used with the socket being tested.

Upon turning the control switch 5 to A, the voltmeter will read the actual A battery voltage as the filament circuit is closed and if switch 8 is then closed the voltmeter will read on the 1 to the 7½ volt scale, and should show full A battery voltage when the rheostats in the set are on full.

If the meter should read backwards the reversal of switch 8 to negative position will correct this difficulty. If the voltmeter in these cases fails to read then the filament circuit is open and this difficulty should be corrected.

To determine whether there is an open, short, or a ground, in the primary and secondary, turn the control switch 5 to P—S and in this case the voltmeter should read less than the sum of the A, B, C, batteries combined. If there is no reading of the voltmeter the primary or secondary is open and it is necessary to turn the control switch 5 to P whereby a failure to note any reading on the voltmeter indicates that the primary circuit is open. If the voltmeter reads the full scale of the B battery, the primary is short circuited or grounded between the primary and the plate of the tube.

When the control switch 5 is turned to B the reading on the voltmeter 11 should be the full B battery voltage and not the voltage actually on the plate.

In order to determine whether the grid circuit is open the switch control member 5 should be turned to G, and switch 7 turned on so that the voltmeter will read on the 7½ volt scale. If the meter fails to read, the grid circuit is open. This completes the normal test on the set and its elements under normal inactive conditions.

After having repaired any trouble caused by the above test, the set is subjected to a dynamic test which is carried on as follows: all the tubes in the set are placed in position and a station which is broadcasting is tuned in. If no station is broadcasting the wave meter 77 is applied and once the set is tuned the wave meter is tuned off.

First, the first tube in the set is removed and is replaced by the test plug 21 of the set tester and the tube which has been removed from the set is placed into the socket 4 of the set checker. The switch 23 is set in on position and the milliammeter will now read the actual plate current consumed by that tube. This reading should never be as high as that indicated by the reading, which is produced when the tube is tested with a bench tester since there is a load carried thereby in both the grid and plate circuits which is now to be considered.

To further test, the dynamic characteristics of a tube, the switch 24 is turned to its on position, and switch 10 on the on position, and switch 8 either positive or negative, as the case may require, and control switch 5 on pot. and finally switch 9 on the on position. Turn the potentiometer and there will be observed a series of changes in the milliammeter corresponding to the various readings on the voltmeter.

The dynamic curve can then be drawn by plotting the volts as read from the voltmeter and the milliammeter reading on a graph sheet. These curves should be different from the grid voltage plate current curve drawn from the ordinary tube tester since in this case the load on the plate and grid circuit during actual operating conditions is indicated.

Further, a test of this type can be carried out with the remaining tubes whether they be detector or simple amplifying tubes, the purpose of the set checker in each of the respective tests being similar to that which has been heretofore described.

These are a few of the possible uses and applications of the set checker which has been described.

While I have described a few of the applications and uses of the present set tester, the device is capable of many other uses and tests, and I do not wish to be limited to the specific details of construction nor tests described, but desire to avail myself of all changes within the scope of the appended claims.

What I claim is:

1. In a testing device for audion tube circuits, the combination of a test connector having contacts corresponding to audion tube terminals and adapted to engage the socket contacts of an audion tube circuit, with a plurality of flexible conductors leading from the contacts of said connector to said testing device, electrical measuring means for indicating the electrical conditions existing at predetermined contacts of said audion tube circuit and a unitary rotary selector switch having test indicia for indicating the various tests controlled by said selector switch and having contacts and circuits for selectively connecting said electrical measuring means to said conductors to indicate the various electrical conditions in the audion circuit on said measuring means.

2. In a testing device for audion tube circuits, the combination of a test connector having contacts corresponding to audion tube terminals and adapted to engage the socket contacts of an audion tube circuit, with a plurality of flexible conductors leading from the contacts of said connector to said testing device, electrical measuring means for indicating the electrical conditions existing at predetermined contacts of said audion tube circuit, auxiliary audion tube socket contacts adapted to be energized through said test connector for receiving an audion tube to operate with said audion tube circuit, and a unitary rotary selector switch for selectively connecting said measuring means to said auxiliary socket contacts to indicate voltage conditions existing at the contacts under load.

3. In a testing device for audion tube circuits, the combination of a test connector having contacts corresponding to audion tube terminals and adapted to engage the socket contacts of an audion tube circuit, with a plurality of flexible conductors leading from the contacts of said connector to said testing device, electrical measuring means for indicating the electrical conditions existing at predetermined contacts of said audion tube circuit, auxiliary audion tube socket contacts adapted to be energized through said test connector for receiving an audion tube to operate with said audion tube circuit, a unitary rotary selector switch for controlling the connection of said electrical measuring means to said auxiliary socket contacts, switch contacts and circuits and test indicia for said selector switch for selectively indicating the connection of said measuring means to measure plate voltage, grid voltage to either terminal of the filament, or filament voltage existing at the socket of the audion tube circuit.

4. In a testing device for audion tube circuits, the combination of a test connector having contacts corresponding to audion tube terminals and adapted to engage the socket contacts of an audion tube circuit, with a plurality of flexible conductors leading from the contacts of said connector to said testing device, electrical measuring means for indicating the electrical conditions existing at predetermined contacts of said audion tube circuit, an auxiliary conductor extending from said testing device and having a detachable connecting device at its end for connection to various points of potential in the audion tube circuit, and a unitary rotary selector switch for selectively connecting said measuring means to predetermined of said conductors to indicate electrical conditions existing in the audion circuit between predetermined contacts or between a predetermined contact and the auxiliary test lead.

5. In a testing device for audion tube circuits, the combination of a test connector having contacts corresponding to the terminals of an audion tube and adapted to engage the contacts of an audion tube circuit, with a plurality of conductors leading from the contacts of said test connector to said testing device, electrical indicating means and an oscillation source associated with said testing device for impressing oscillations of predetermined frequency on the audion tube circuit in lieu of broadcast oscillations.

6. In a testing device for audion tube circuits, the combination of a test connector having contacts adapted to engage predetermined contacts of a socket in the audion tube circuit, with a plurality of flexible conductors leading from the contacts of said connector to said testing device, an oscillation source associated with said testing device for impressing oscillations of predetermined frequency on the audion tube circuit at the will of the operator, means for indicating the frequency of the oscillations impressed on the audion tube circuit and switch means for controlling the connection of said oscillation source to the audion tube circuit.

7. In a testing device for audion tube circuits, the combination of a test connector having contacts adapted to engage predetermined socket contacts of an audion tube circuit, with a plurality of flexible conductors leading from the contacts of said test connector to said testing device, an oscillation source having a separate source of energization associated with said testing device to impress oscillations of predetermined frequency on said audion tube circuit at the will of the operator, means for determining and indicating the frequency of said oscillations, and means for controlling the strength of the electrical oscillations impressed upon the audion tube circuit.

8. In a testing device for audion tube circuits, the combination of a test connector having contacts adapted to engage predetermined socket contacts of an audion tube circuit, with a plurality of conductors leading from the contacts of said connector to said testing device, an oscillation source associated with said testing device for impressing electrical oscillations of predetermined characteristics on the audion tube circuit, means for indicating a tuning characteristic of said oscillations, whereby the tuning devices and indicia of the audion tube circuit may be calibrated with the indicating means of said oscillation source.

9. In a radio set tester, the combination of a tester plug comprising an elongated insulating body adapted to have an elongated handle projecting from a radio tube socket when inserted therein, said plug having plate and filament contacts for engaging the contacts of said socket, a unitary flexible cable extending from said test plug and comprising flexible conductors leading from said plate and filament contacts with a covering for forming said conductors into a cable, an electron tube socket, having socket contacts, for receiving the tube to be tested, and electrical measuring means for determining the voltage and current conditions between predetermined socket contacts under operating conditions.

10. In a testing device for audion tube circuits, the combination of a test connector having contacts corresponding to predetermined audion tube terminals with a plurality of flexible leads extending from said test connector contacts to said testing device, a separately energized source of electrical oscillations adapted to be connected to one of the grid circuits of said audion tube circuit, said oscillation source comprising a make and break device, a source of electromotive force, and a wave meter having indicia for indicating the frenquency of the oscillations impressed on the audion tube circuit.

J. C. HOOVER.